(12) United States Patent
Aoyama (10) Patent No.: US 12,307,837 B2
(45) Date of Patent: May 20, 2025

(54) EVENT INFORMATION RECORDING DEVICE AND EVENT INFORMATION REFERENCE SYSTEM

(71) Applicant: ISUZU MOTORS LIMITED, Tokyo (JP)

(72) Inventor: Dai Aoyama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 345 days.

(21) Appl. No.: 17/800,839

(22) PCT Filed: Feb. 15, 2021

(86) PCT No.: PCT/JP2021/005423
§ 371 (c)(1),
(2) Date: Aug. 18, 2022

(87) PCT Pub. No.: WO2021/166826
PCT Pub. Date: Aug. 26, 2021

(65) Prior Publication Data
US 2023/0086520 A1    Mar. 23, 2023

(30) Foreign Application Priority Data
Feb. 20, 2020   (JP) ................ 2020-027026

(51) Int. Cl.
*G07C 5/08* (2006.01)
*G06F 11/07* (2006.01)

(52) U.S. Cl.
CPC ........ *G07C 5/0866* (2013.01); *G06F 11/0739* (2013.01)

(58) Field of Classification Search
CPC .... G07C 5/0866; G07C 5/085; G06F 11/0739
See application file for complete search history.

(56) References Cited

U.S. PATENT DOCUMENTS 4,258,421 A * 3/1981 Juhasz ............... G07C 5/085
                                                      701/33.9
4,281,354 A * 7/1981 Conte ................. G08G 1/00
                                                      348/148
(Continued)

FOREIGN PATENT DOCUMENTS

CN    104268958 A    1/2015
CN    109565564 A    4/2019
(Continued)

OTHER PUBLICATIONS

Patent Cooperation Treaty, International Search Report, Application No. PCT/JP2021/005423, dated Mar. 12, 2021, in 7 pages.
(Continued)

*Primary Examiner* — Bhavesh V Amin
(74) *Attorney, Agent, or Firm* — PROCOPIO, CORY, HARGREAVES & SAVITCH LLP (57) ABSTRACT

This event information recording device 10 includes: a detection unit 131 which detects the occurrence of an event related to a vehicle V; a first storage unit 11 which stores event information that is information on an event occurring in the vehicle V in correspondence to each of a plurality of event types indicating types of events, and stores index information including the number of event occurrences, which is the number of occurrences of events corresponding to each of the plurality of event types; and a storage control unit 132 which, when the detection unit 131 detects the occurrence of an event, adds 1 to the number of event occurrences included in the index information stored in the first storage unit 11 in correspondence to the type of the event.

2 Claims, 4 Drawing Sheets

(56) References Cited

U.S. PATENT DOCUMENTS

| | | | | |
|---|---|---|---|---|
| 4,528,547 A * | 7/1985 | Rodney | ............ | B60R 16/0236 340/439 |
| 4,533,962 A * | 8/1985 | Decker | ............ | G07C 5/085 360/6 |
| 4,558,379 A * | 12/1985 | Huetter et al. | ............ | G01R 13/06 360/32 |
| 4,638,289 A * | 1/1987 | Zottnik | ............ | G07C 5/0825 340/436 |
| 4,671,111 A * | 6/1987 | Lemelson | ............ | G07C 5/008 340/439 |
| 4,688,244 A * | 8/1987 | Hannon | ............ | G08B 13/14 235/375 |
| 4,750,197 A * | 6/1988 | Denekamp | ............ | G07C 5/008 235/375 |
| 4,763,745 A * | 8/1988 | Eto | ............ | B62D 6/00 701/1 |
| 4,789,904 A * | 12/1988 | Peterson | ............ | G07C 5/0891 386/358 |
| 4,804,937 A * | 2/1989 | Barbiaux | ............ | G07C 5/008 340/459 |
| 4,807,179 A * | 2/1989 | Clere | ............ | G07C 5/085 711/101 |
| 4,843,463 A * | 6/1989 | Michetti | ............ | B60R 11/04 348/E7.086 |
| 4,853,859 A * | 8/1989 | Morita | ............ | G07C 5/0858 340/459 |
| 4,926,331 A * | 5/1990 | Windle | ............ | G07C 5/085 701/34.3 |
| 4,942,464 A * | 7/1990 | Milatz | ............ | G07F 19/20 340/541 |
| 4,949,186 A * | 8/1990 | Peterson | ............ | G08G 1/0175 348/149 |
| 4,992,943 A * | 2/1991 | McCracken | ............ | G07C 5/085 701/33.9 |
| 5,046,007 A * | 9/1991 | McCrery | ............ | G01D 9/005 702/158 |
| 5,050,166 A * | 9/1991 | Cantoni | ............ | H04L 47/34 370/473 |
| 5,144,661 A * | 9/1992 | Shamosh | ............ | G08B 13/19695 348/143 |
| 5,196,938 A * | 3/1993 | Blessinger | ............ | H04N 5/783 348/E5.037 |
| 5,305,214 A * | 4/1994 | Komatsu | ............ | G07C 5/085 701/32.9 |
| 5,305,216 A * | 4/1994 | Okura | ............ | F02D 41/26 123/480 |
| 5,309,485 A * | 5/1994 | Chao | ............ | G21C 17/00 376/217 |
| 5,311,197 A * | 5/1994 | Sorden | ............ | G01S 5/0027 342/357.31 |
| 5,465,079 A * | 11/1995 | Bouchard | ............ | G07C 5/0858 340/576 |
| 5,499,182 A * | 3/1996 | Ousborne | ............ | G06F 11/34 701/33.9 |
| 5,581,464 A * | 12/1996 | Woll | ............ | G07C 5/0858 340/459 |
| 6,026,340 A * | 2/2000 | Corrado | ............ | B60N 2/0029 701/47 |
| 6,721,640 B2 * | 4/2004 | Glenn | ............ | G07C 5/0891 340/945 |
| 7,131,136 B2 * | 10/2006 | Monroe | ............ | H04N 7/181 348/E7.086 |
| 8,140,358 B1 * | 3/2012 | Ling | ............ | G07C 5/008 340/439 |
| 8,818,614 B1 * | 8/2014 | Lekutai | ............ | G07C 3/00 701/70 |
| 8,874,301 B1 * | 10/2014 | Rao | ............ | B60K 28/04 340/576 |
| 9,043,041 B2 * | 5/2015 | Willis | ............ | G01C 21/185 701/1 |
| 9,472,029 B2 * | 10/2016 | Plante | ............ | G07C 5/008 |
| 9,501,878 B2 * | 11/2016 | Palmer | ............ | G07C 5/0841 |
| 9,554,080 B2 * | 1/2017 | Plante | ............ | B60R 11/04 |
| 9,633,318 B2 * | 4/2017 | Plante | ............ | G07C 5/085 |
| 9,679,424 B2 * | 6/2017 | Plante | ............ | G07C 5/0858 |
| 9,718,557 B2 * | 8/2017 | Zubairi | ............ | B64D 45/00 |
| 9,728,228 B2 * | 8/2017 | Palmer | ............ | G11B 27/105 |
| 9,738,156 B2 * | 8/2017 | Plante | ............ | B60K 35/22 |
| 9,761,067 B2 * | 9/2017 | Plante | ............ | B60W 40/08 |
| 9,942,526 B2 * | 4/2018 | Plante | ............ | H04L 67/01 |
| 10,189,352 B2 * | 1/2019 | Virgilio | ............ | G07C 5/085 |
| 10,249,105 B2 * | 4/2019 | Palmer | ............ | B60W 40/09 |
| 10,687,031 B2 * | 6/2020 | Imomoto | ............ | H04N 7/188 |
| 10,930,093 B2 * | 2/2021 | Palmer | ............ | G07C 5/0866 |
| 11,069,257 B2 * | 7/2021 | Palmer | ............ | G09B 19/167 |
| 11,838,364 B2 * | 12/2023 | Sukhov | ............ | H04W 4/029 |
| 2003/0093187 A1 * | 5/2003 | Walker | ............ | B64D 45/0059 701/1 |
| 2004/0230352 A1 * | 11/2004 | Monroe | ............ | G07C 5/085 701/3 |
| 2005/0162513 A1 * | 7/2005 | Chan | ............ | G07C 5/085 348/118 |
| 2006/0026017 A1 * | 2/2006 | Walker | ............ | H04L 63/302 701/31.4 |
| 2006/0206246 A1 * | 9/2006 | Walker | ............ | H04L 63/302 701/16 |
| 2007/0076312 A1 * | 4/2007 | Jordan | ............ | G07C 5/008 360/32 |
| 2007/0086624 A1 * | 4/2007 | Breed | ............ | B60R 21/01552 382/104 |
| 2007/0124042 A1 * | 5/2007 | Monroe | ............ | G08B 13/19663 701/3 |
| 2008/0195261 A1 * | 8/2008 | Breed | ............ | B60R 21/0132 701/2 |
| 2009/0240394 A1 * | 9/2009 | He | ............ | G07C 5/0841 701/33.4 |
| 2009/0268947 A1 * | 10/2009 | Schaufler | ............ | G06V 20/56 382/104 |
| 2009/0328130 A1 * | 12/2009 | Hamilton | ............ | G06F 12/1466 726/1 |
| 2010/0174449 A1 * | 7/2010 | Kim | ............ | G07C 5/0866 701/33.4 |
| 2010/0208076 A1 * | 8/2010 | Kinoshita | ............ | G06V 20/56 348/148 |
| 2013/0208111 A1 * | 8/2013 | Kidd | ............ | G07C 5/0866 348/143 |
| 2013/0278772 A1 * | 10/2013 | Yun | ............ | B60K 35/81 348/148 |
| 2013/0302758 A1 * | 11/2013 | Wright | ............ | H04M 1/72454 701/1 |
| 2014/0058583 A1 * | 2/2014 | Kesavan | ............ | B62D 41/00 701/1 |
| 2015/0112542 A1 * | 4/2015 | Fuglewicz | ............ | G07C 5/0858 701/1 |
| 2016/0048709 A1 * | 2/2016 | Butler | ............ | H01Q 9/285 340/10.51 |
| 2016/0061855 A1 * | 3/2016 | Helck | ............ | G01P 7/00 702/142 |
| 2016/0071228 A1 * | 3/2016 | Wendel | ............ | G08B 13/19676 348/148 |
| 2016/0140872 A1 * | 5/2016 | Palmer | ............ | G09B 19/167 434/65 |
| 2016/0152180 A1 * | 6/2016 | Kirsch | ............ | B60Q 1/00 701/36 |
| 2017/0309088 A1 * | 10/2017 | Arya | ............ | H04L 69/14 |
| 2017/0330398 A1 * | 11/2017 | Jordan | ............ | H04N 5/9201 |
| 2018/0056784 A1 * | 3/2018 | Virgilio | ............ | B60K 28/066 |
| 2018/0136653 A1 * | 5/2018 | Tao | ............ | B60W 60/0016 |
| 2018/0211452 A1 * | 7/2018 | Watanabe | ............ | G07C 5/085 |
| 2019/0068925 A1 * | 2/2019 | Imomoto | ............ | H04N 5/77 |
| 2019/0096263 A1 * | 3/2019 | Hirahara | ............ | G07C 5/008 |
| 2019/0222809 A1 * | 7/2019 | Murata | ............ | H04N 5/772 |
| 2019/0385383 A1 * | 12/2019 | Sato | ............ | G07C 5/0866 |
| 2021/0274136 A1 * | 9/2021 | Murata | ............ | H04N 5/765 |

(56) References Cited

U.S. PATENT DOCUMENTS

2023/0026085 A1* 1/2023 Murata .............. H04N 5/765
2023/0086520 A1* 3/2023 Aoyama .............. G07C 5/085
701/29.1

FOREIGN PATENT DOCUMENTS

| | | |
|---|---|---|
| JP | 2009-093254 A | 4/2009 |
| JP | 2017-157028 A | 9/2017 |
| JP | 2018-120588 A | 8/2018 |
| JP | 2019-040364 A | 3/2019 |
| JP | 2019-045926 A | 3/2019 |
| JP | 2019-168921 A | 10/2019 |
| JP | 2019-191639 A | 10/2019 |

OTHER PUBLICATIONS

Patent Cooperation Treaty, WOSA, Application No. PCT/JP2021/005423, dated Mar. 12, 2021, in 3 pages.
Chinese National Intellectual Property Administration, Notification of the First Office Action, Application No. CN 202180015686.X, dated Apr. 24, 2023, in 17 pages.

* cited by examiner

EVENT INFORMATION RECORDING DEVICE AND EVENT INFORMATION REFERENCE SYSTEM

CROSS-REFERENCE TO RELATED APPLICATIONS

This application is US National Stage of International Patent Application PCT/JP2021-005423, filed Feb. 15, 2021, which claims benefit of priority from Japanese Patent Application JP2020-027026, filed Feb. 20, 2020, the contents of both of which are incorporated herein by reference.

TECHNICAL FIELD

The present disclosure relates to an event information recording device and an event information reference system.

BACKGROUND ART

A recording device that records event information generated in a vehicle is known in the related art. For example, Patent Literature 1 discloses a recording device that records event information in association with vehicle operation information and vehicle position information when an event such as an accident or dangerous traveling is detected.

CITATION LIST

Patent Literature

Patent Literature 1: JP 2017-157028 A

SUMMARY OF INVENTION

Technical Problem

Event information is referred to by various tools such as an operation diagnosis tool for a vehicle. In the related art, various tools refer to all pieces of event information subsequentially to identify a newly occurring event. For this reason, it may take time to specify a newly occurring event.

Accordingly, the present disclosure is made in view of this concern, and an object of the present disclosure is to provide an event information recording device and an event information reference system that can shorten time for specifying a newly occurring event.

Solution to Problem

According to a first illustrative aspect of the present disclosure, provided is an event information recording device including: a detection unit configured to detect an occurrence of an event related to a vehicle; a storage unit configured to store event information in association with a corresponding one of a plurality of event types that indicates a type of the event occurring in the vehicle, the event information being information on the event, and to store index information including an event occurrence count, the event occurrence count being a count of occurrences the event in association with a corresponding one of the plurality of event types; and a storage control unit configured to, when the detection unit detects the occurrence of the event, add one to the event occurrence count included in the index information stored in the storage unit in association with the event type.

The detection unit may detect an end of the event, The storage unit may store the index information, the index information further including an event end count that is a count of ends the event in association with a corresponding one of the plurality of event types, and when the detection unit detects the end of the event, the storage control unit may add one to the event end count included in the index information stored in the storage unit in association with the event type of the event.

According to a second illustrative aspect of the present disclosure, provided is an event information reference system including: an event information recording device configured to record an event related to a vehicle, the event information recording device being mounted on the vehicle; and a reference device configured to refer to the event, wherein the event information recording device includes: a detection unit configured to detect an occurrence of the event related to the vehicle; a recording device-side storage unit configured to store event information in association with a corresponding one of a plurality of event types that indicates a type of the event, the event information being information on the event, and to store index information including an event occurrence count, the event occurrence count being a count of occurrences of the event in association with a corresponding one of the plurality of event types; and a storage control unit configured to, when the detection unit detects the occurrence of the event, add one to the event occurrence count included in the index information stored in the recording device-side storage unit in association with the event type, wherein the reference device includes: a reference device-side storage unit configured to store an event occurrence count in association with a target event that is the event to be referred to by the reference device; a determination unit configured to refer to the index information stored in the recording device-side storage unit and to determine whether the event occurrence count of the target event included in the index information is consistent with the event occurrence count of the target event stored in the reference device-side storage unit; and an obtaining unit configured to obtain the event information in association with the target event from the recording device-side storage unit when the determination unit determines that the event occurrence counts of the target event are inconsistent.

The reference device-side storage unit may be further configured to: store the event information obtained by the obtaining unit; and add one to the event occurrence count of the target event stored in the reference device-side storage unit.

Advantageous Effects of Invention

According to the present disclosure, it is possible to reduce time for specifying a newly occurring event.

DESCRIPTION OF EMBODIMENTS

Figure 1:
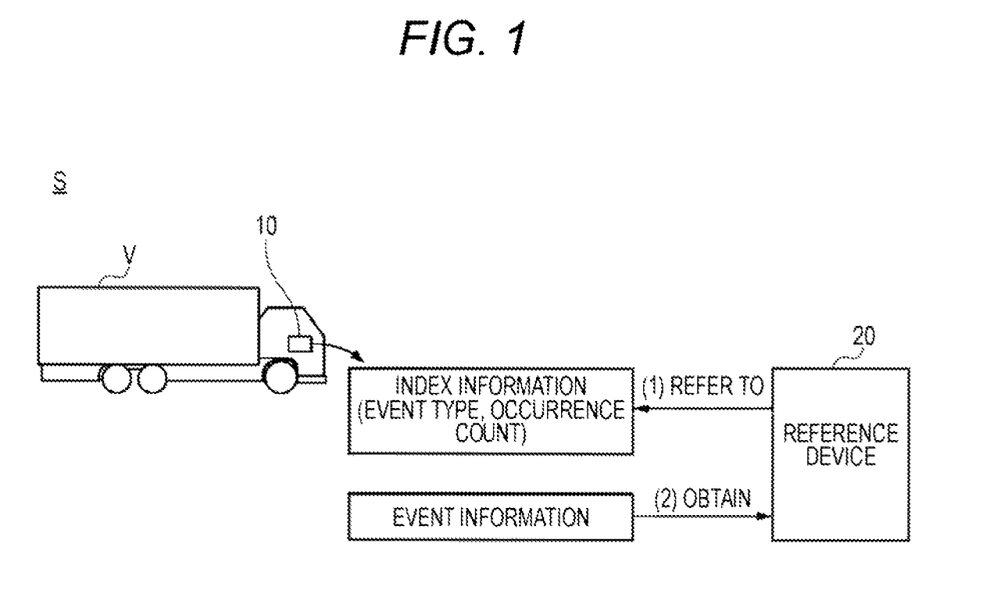
FIG. 1 shows an overview of an event information reference system according to an embodiment.

FIG. 1 shows an overview of an event information reference system S according to the present embodiment. The event information reference system S is a system including an event information recording device 10 that records event information on an event occurring in a vehicle V, and a reference device 20 that refers to the event information.

The event information recording device 10 is a computer that is mounted on the vehicle V such as a car, a bus, or a truck and records event information. The reference device 20 is a computer such as a server provided outside the vehicle V The reference device 20 obtains event information on a target event, which is an event to be referred to by the reference device 20, from the event information recording device 10. The reference device 20 may be a computer provided in the vehicle V.

In the present embodiment, the event information recording device 10 stores event information in association with a corresponding one of a plurality of event types that indicates a type of an event, and also stores index information including an event occurrence count, which is the count of occurrences of an event in association with a corresponding one of the plurality of event types.

The reference device 20 stores an event occurrence count of a target event. The reference device 20 refers to the event occurrence count of the target event included in the index information stored in the event information recording device 10, and obtains the event information on the target event when the referred event occurrence count is inconsistent with the event occurrence count of the target event stored in the reference device 20.

In this way, the reference device 20 can specify a newly occurring target event simply by referring to the event occurrence count included in the index information. Accordingly, it is possible to shorten time for specifying a newly occurring target event compared to a case of specifying the newly occurring target event by referring to the event information. Next, the event information recording device 10 and the reference device 20 configuring the event information reference system S will be described in detail.

<Configuration of Vehicle V>

Figure 2:
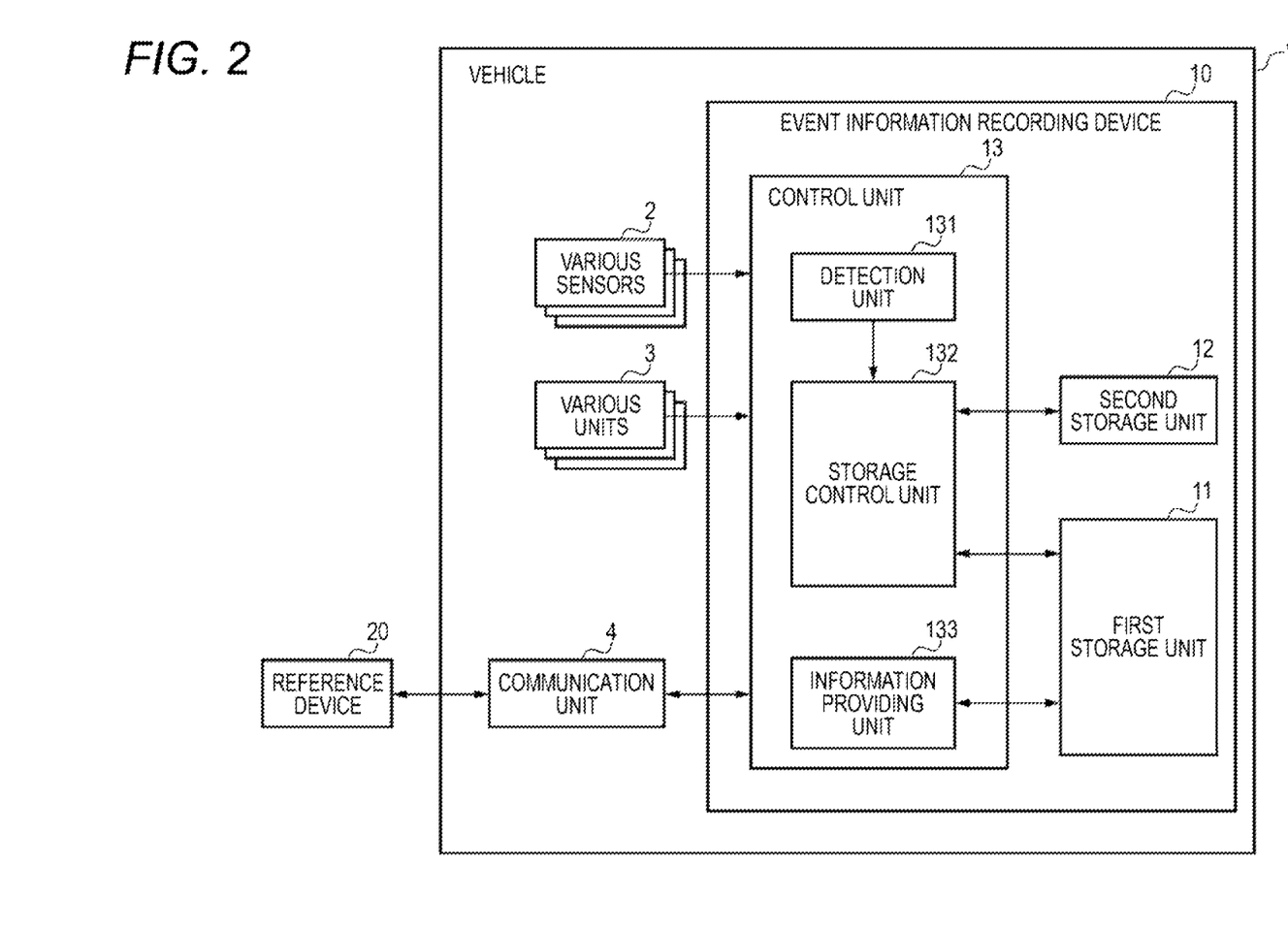
FIG. 2 schematically shows an internal configuration of a vehicle according to the present embodiment.

When describing the event information recording device 10 and the reference device 20 in detail, an internal configuration of the vehicle V will be described. FIG. 2 schematically shows the internal configuration of the vehicle V according to the present embodiment. The vehicle V includes various sensors 2, various units 3, a communication unit 4 the event information recording device 10, and the reference device 20.

The various sensors 2 are sensors that measure information on the vehicle V, and include a speed sensor, an acceleration sensor, an accelerator sensor, a brake sensor, a steering sensor, and the like. The various sensors 2 perform measurement at predetermined time intervals, and output measurement data indicating measurement results to the event information recording device 10.

The various units 3 are, for example, ECUs provided in the vehicle V, and include an engine control ECU, a brake control ECU, a transmission control ECU, and the like. The communication unit 4 is, for example, a radio frequency (RF) unit that transmits and receives information to and from an external device such as the reference device 20 via wireless communication. When the reference device 20 is a computer provided in the vehicle V, the communication unit 4 is, for example, an interface that transmits and receives information to and from the reference device 20 via wired communication.

<Configuration of Event Information Recording Device 10>

Next, a configuration of the event information recording device 10 will be described. As shown in FIG. 2, the event information recording device 10 includes a first storage unit 11, a second storage unit 12, and a control unit 13.

The first storage unit 11 is, for example, a read only memory (ROM) or a random access memory (RAM). The first storage unit 11 stores various programs that cause the control unit 13 to function. The first storage unit 11 stores programs that cause the control unit 13 to function as a detection unit 131, a storage control unit 132, and an information providing unit 133.

The first storage unit 11 further stores event information in association with a corresponding one of a plurality of event types. The first storage unit 11 further stores index information including an event occurrence count of an event in association with a corresponding one of the plurality of event types.

Specifically, the first storage unit 11 includes an event information storage area and an index information storage area. In the event information storage area, a storage area is allocated in association with a corresponding one of a plurality of event types, and the event information is stored in the storage area in association with the event type of the event information. The event information is, for example, information in which event occurrence time, a travel distance of the vehicle V at the event occurrence time, and measurement data output from the various sensors 2 at the event occurrence time or before and after the event are associated with each other. The storage capacity of the event information storage area is limited, and the first storage unit 11 stores a predetermined number of pieces of relatively new event information for each of the plurality of event types.

The first storage unit 11 stores the index information in the index information storage area. In the index information storage area, an address is assigned in association with a corresponding one of a plurality of event types. The first storage unit 11 stores, in a storage area having the address in association with the event type in the index information storage area, index information including the event occurrence count of an event in association with the event type and an event end count that is the count of ends of the event.

The second storage unit 12 is, for example, a RAM. The second storage unit 12 functions as a buffer and temporarily stores measurement data obtained from the various sensors 2.

The control unit 13 is a computing resource including a processor such as a central processing unit (CPU) (not shown). The control unit 13 functions as the detection unit 131, the storage control unit 132, and the information providing unit 133 by executing the programs stored in the first storage unit 11.

The detection unit 131 detects an occurrence of an event related to the vehicle V For example, the detection unit 131 detects the occurrence of an event by receiving an event occurrence signal indicating the occurrence of an event from the various units 3. The detection unit 131 may detect the occurrence of an event by monitoring whether an event occurrence signal is output from the various units 3.

After detecting the occurrence of an event related to the vehicle V, the detection unit 131 detects an end of the event. For example, an event period indicating a length of the event is set for each of a plurality of event types. When the event period associated with the event type in association with the event elapses after the occurrence of the event is detected, the detection unit 131 detects the end of the event.

When the detection unit 131 detects the occurrence of an event, the storage control unit 132 adds one to the event occurrence count included in the index information stored in the first storage unit 11 in association with the event type of the event, and updates the event occurrence count. For example, when the detection unit 131 detects the occurrence of an event, the storage control unit 132 specifies the event type of the occurring event based on the event occurrence signal received from the various units 3. The storage control unit 132 increases the event occurrence count, which is stored in a storage area having an address in association with the specified event type in the index information storage area of the first storage unit 11, by one, thereby updating the event occurrence count.

When the detection unit 131 detects the occurrence of an event, the storage control unit 132 stores event information on the event in the event information storage area. For example, a type of one or more pieces of measurement data obtained as the event information and an obtaining period of the measurement data are set in association with the event type. The obtaining period of the measurement data is determined for each of the one or more pieces of measurement data. The start time of the obtaining period of the measurement data is, for example, event occurrence time, and time before and after the event occurrence time are determined depending on the measurement data. The end time of the obtaining period of the measurement data is, for example, the event occurrence time, and time before and after the event occurrence time are determined depending on the measurement data.

When the detection unit 131 detects the occurrence of an event, the storage control unit 132 collects measurement data based on an obtaining period of each of one or more pieces of measurement data determined for the event type in association with the event. The storage control unit 132 stores the collected measurement data as event information in the event information storage area of the first storage unit 11.

For example, when the start time of the obtaining period of predetermined measurement data among one or more pieces of measurement data determined for the event type of the occurring event is time before the event occurrence time, the storage control unit 132 collects the predetermined measurement data stored in the second storage unit 12 from the start time on, and stores the predetermined measurement data in the event information storage area.

When the end time of the obtaining period of the predetermined measurement data among one or more pieces of measurement data determined for the event type of the occurring event is time after the event start time, the storage control unit 132 stores the predetermined measurement data obtained from the various sensors 2 in the event information storage area in real time until the end time arrives.

When the detection unit 131 detects an end of an event, the storage control unit 132 adds one to the event end count included in the index information stored in the first storage unit 11 in association with the event type of the event, and updates the event end count. For example, when the detection unit 131 detects the end of an event, the storage control unit 132 increases the event end count, which is stored in a storage area having an address in association with the event type of the event in the index information storage area of the first storage unit 11, by one, thereby updating the event end count.

The information providing unit 133 obtains an information obtaining request from the reference device 20 via the communication unit 4. The information obtaining request includes, for example, address information on the index information storage area in association with the event type to be referred to, or address information on the event information storage area in association with the event type to be referred to. The information providing unit 133 provides index information or event information in response to the address information included in the information obtaining request to the reference device 20 via the communication unit 4.

<Configuration of Reference Device 20>

Figure 3:
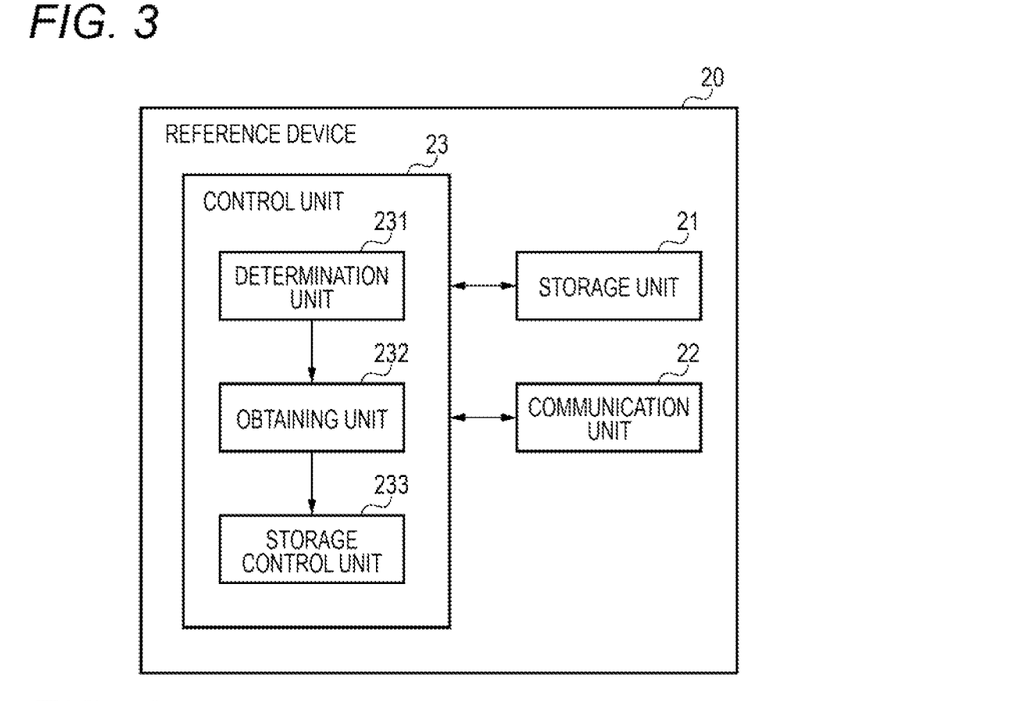
FIG. 3 shows a configuration of a reference device according to the present embodiment.

Next, a configuration of the reference device 20 will be described. FIG. 3 shows the configuration of the reference device 20 according to the present embodiment. As shown in FIG. 3, the reference device 20 includes a storage unit 21, a communication unit 22, and a control unit 23.

The storage unit 21 is, for example, a ROM or a RAM. The storage unit 21 stores various programs that cause the control unit 23 to function. The storage unit 21 stores programs that cause the control unit 23 to function as a determination unit 231, an obtaining unit 232, and a storage control unit 233.

The storage unit 21 further stores an event occurrence count or an event end count in association with a target event to be referred to by the storage unit 21. For example, when the obtaining timing of event information in association with the target event is the event occurrence time, the storage unit 21 stores the event type of the target event, the event occurrence count or the event end count of the target event, address information on the index information storage area in association with the target event, and address information on the event information storage area in association with the target event in association with each other.

Although the storage unit 21 stores the event type of the target event, the event occurrence count or the event end count of the target event, and the address information on the index information storage area in association with the target event in association with each other, the present disclosure is not limited thereto. The storage unit 21 may store the event type of the target event, the event occurrence count or the event end count of the target event, and address information on the event occurrence count or the event end count in the index information storage area in association with the target event in association with each other.

The communication unit 22 is, for example, an interface that communicates with the event information recording device 10. The communication unit 22 communicates with the event information recording device 10 under the control of the control unit 23.

The control unit 23 is a computing resource including a processor such as a CPU (not shown). The control unit 23 functions as the determination unit 231, the obtaining unit 232, and the storage control unit 233 by executing the programs stored in the storage unit 21.

The determination unit 231 sequentially determines whether an event newly occurs for each of a plurality of target events. For example, the determination unit 231 sequentially selects an event type of one target event among a plurality of target events at a predetermined time interval (for example, five seconds). The determination unit 231 communicates with the event information recording device 10 via the communication unit 22 to determine whether a target event of the selected event type newly occurs.

Specifically, when the obtaining timing of event information on the target event in association with the selected event type is the event occurrence time, the determination unit 231 refers to the index information stored in the event information recording device 10, and determines whether the event occurrence count of the target event included in the index information is consistent with the event occurrence count of the target event stored in the storage unit 21.

For example, the determination unit 231 specifies address information on the index information storage area stored in the storage unit 21 in association with the selected event type.

The determination unit 231 transmits an information obtaining request including the specified address information on the index information storage area via the communication unit 22, and obtains information including the event occurrence count of the target event from the event information recording device 10. The determination unit 231 then determines whether the event occurrence count of the target event included in the obtained information is consistent with the event occurrence count of the target event stored in the storage unit 21.

When the obtaining timing of the event information on the target event is the event end time, the determination unit 231 refers to the index information stored in the event information recording device 10, and determines whether the event end count of the target event included in the index information is consistent with the event end count of the target event stored in the storage unit 21.

For example, the determination unit 231 specifies address information on the index information storage area stored in the storage unit 21 in association with the selected event type. The determination unit 231 transmits an information obtaining request including the specified address information on the index information storage area via the communication unit 22, and obtains information including the event end count of the target event from the event information recording device 10. Then, the determination unit 231 determines whether the event end count of the target event included in the obtained information is consistent with the event end count of the target event stored in the storage unit 21.

When the determination unit 231 determines that the event occurrence counts of the target event are inconsistent, the obtaining unit 232 obtains event information in association with the target event from the event information recording device 10. For example, the obtaining unit 232 transmits an information obtaining request including address information on the event information storage area in association with the target event to the event information recording device 10 via the communication unit 22, and obtains the event information on the target event from the event information recording device 10. In this way, the reference device 20 can obtain the event information in association with the occurrence timing of the event.

Similarly, when the determination unit 231 determines that the event end counts of the target event are inconsistent, the obtaining unit 232 obtains event information in association with the target event from the event information recording device 10. For example, the obtaining unit 232 transmits an information obtaining request including address information on the event information storage area in association with the target event to the event information recording device 10 via the communication unit 22, and obtains the event information on the target event from the event information recording device 10. In this way, the reference device 20 can obtain the event information in association with the end timing of the event. The storage control unit 233 stores the event information obtained by the obtaining unit 232 in the storage unit 21.

<Processing Flow of Event Information Reference System S>

Figure 4:
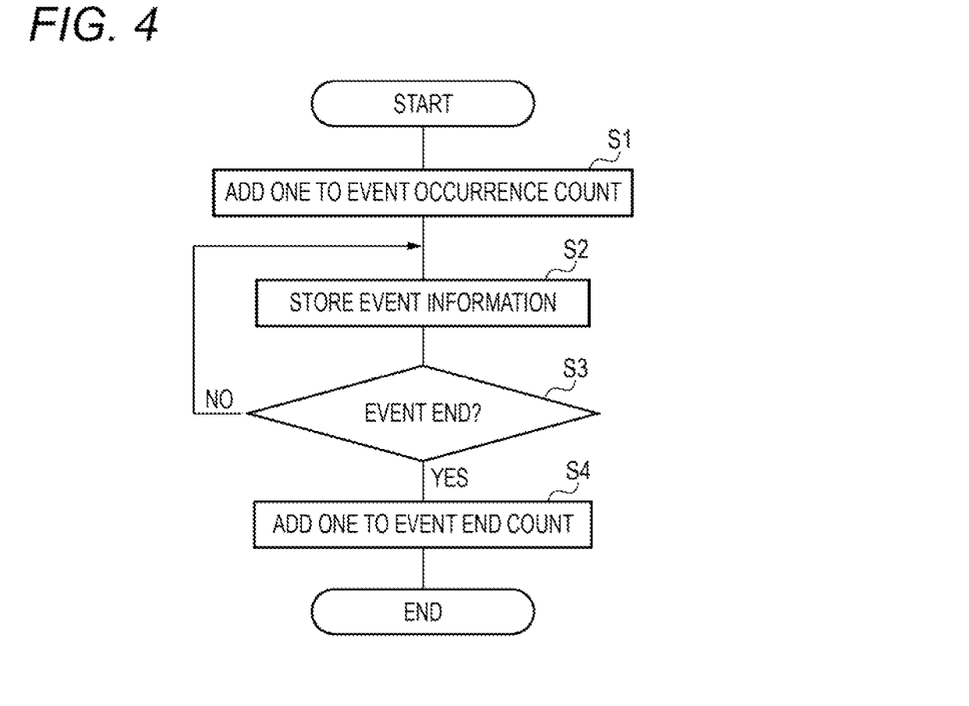
FIG. 4 is a sequence diagram showing an example of a processing flow in the event information reference system according to the present embodiment.

Next, a processing flow in the event information reference system S will be described. First, a processing flow when the event information recording device 10 detects an occurrence of an event will be described. FIG. 4 is a flowchart showing a processing flow when the event information recording device 10 according to the present embodiment detects an occurrence of an event.

First, when the detection unit 131 detects the occurrence of an event, the storage control unit 132 adds one to the event occurrence count included in the index information stored in the first storage unit 11 in association with the type of the event, and updates the event occurrence count (S1).

Subsequently, the storage control unit 132 collects one or more pieces of measurement data based on an obtaining period of each of the one or more pieces of measurement data determined for the type of event of which the occurrence is detected by the detection unit 131, and stores event information including the collected measurement data in the event information storage area of the first storage unit 11 (S2).

Subsequently, the storage control unit 132 determines whether the detection unit 131 detected an end of the event (S3). When the storage control unit 132 determines that the detection unit 131 detected the end of the event (YES in S3), the storage control unit 132 moves the process to S4, and when the storage control unit 132 determines that the detection unit 131 did not detect the end of the event (NO in S3), the storage control unit 132 moves the process to S2.

When the detection unit 131 detects the end of the event, in S4, the storage control unit 132 adds one to the event end count included in the index information stored in the first storage unit 11 in association with the type of the event, and updates the event end count.

Figure 5:
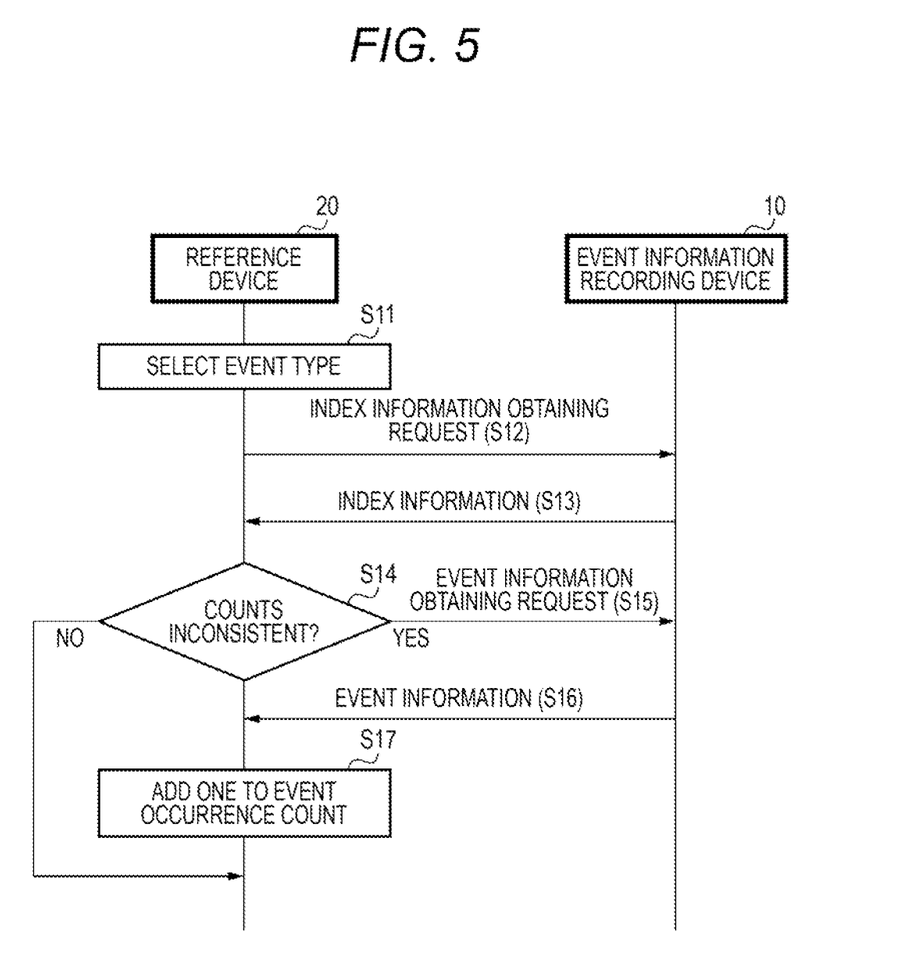
FIG. 5 is a sequence diagram showing an example of a processing flow in the event information reference system when the reference device according to the present embodiment obtains event information.

Next, a processing flow in the event information reference system S when the reference device 20 obtains event information will be described. FIG. 5 is a sequence diagram showing an example of a processing flow in the event information reference system S when the reference device 20 according to the present embodiment obtains event information. It is assumed that the process shown in FIG. 5 is executed at a predetermined time interval (for example, five seconds).

First, the determination unit 231 of the reference device 20 selects an event type in association with target information to be obtained (S11). Subsequently, the determination unit 231 transmits an index information obtaining request, which includes address information on the index information storage area associated with the selected event type of a target event, to the event information recording device 10 via the communication unit 22 (S12).

When the information providing unit 133 of the event information recording device 10 obtains the index information obtaining request from the reference device 20, the information providing unit 133 transmits index information to the reference device 20 via the communication unit 4 based on the address information included in the obtaining request (S13).

The determination unit 231 of the reference device 20 determines whether the occurrence count or the end count included in the index information is inconsistent with the event occurrence count or the event end count in association with the target event (S14).

Specifically, when the obtaining timing of event information on the target event in association with the selected event type is the event occurrence time, the determination unit 231 determines whether the event occurrence count included in the index information obtained from the event information recording device 10 is consistent with the event occurrence count in association with the target event stored in the storage unit 21. When the obtaining timing of the event information on the target event in association with the selected event type is the event end time, the determination unit 231 determines whether the event end count included in the index information obtained from the event information recording device 10 is consistent with the event end count in association with the target event stored in the storage unit 21.

When the determination unit 231 of the reference device 20 determines that the event occurrence counts or the event end counts of the target event is not inconsistent (NO in S14), the determination unit 231 ends the process according to the present sequence. When the determination unit 231 determines that the event occurrence counts or the event end counts of the target event is inconsistent (YES in S14), the obtaining unit 232 transmits an event information obtaining request including address information on the event information storage area in association with the target event to the event information recording device 10 via the communication unit 22 (S15).

When the information providing unit 133 of the event information recording device 10 obtains the information obtaining request including the address information on the event information storage area from the reference device 20, the information providing unit 133 transmits event information to the reference device 20 via the communication unit 4 based on the address information (S16). The obtaining unit 232 of the reference device 20 obtains the event information in association with the target event from the event information recording device 10.

The storage control unit 233 of the reference device 20 stores the event information obtained by the obtaining unit 232 in the storage unit 21. Thereafter, the storage control unit 233 of the reference device 20 adds one to the event occurrence count of the target event stored in the storage unit 21, and updates the event occurrence count (S17).

<Effects>

As described above, when the event information recording device 10 according to the present embodiment detects an occurrence of an event related to the vehicle V, the event information recording device 10 adds one to the event occurrence count included in the index information stored in the first storage unit 11 in association with the type of the event. The reference device 20 refers to the index information stored in the first storage unit 11, and determines whether the event occurrence count of the target event included in the index information is consistent with the event occurrence count of the target event stored in the storage unit 21. When the event occurrence counts are inconsistent, the reference device 20 obtains event information in association with the target event from the event information recording device 10.

In this way, the reference device 20 can specify a newly occurring event simply by referring to the event occurrence count included in the index information. Therefore, the reference device 20 can shorten time for specifying a newly occurring event as compared with a case of specifying a newly occurring event by referring to the event information.

The present disclosure is described using the embodiment, but the technical scope of the present disclosure is not limited to the scope described in the embodiment described above, and various modifications and changes can be made within the scope thereof. In addition, all or a part of a device may be functionally or physically distributed or integrated in any unit. Further, a new embodiment obtained by a combination of a plurality of embodiments is also included in the embodiment of the present disclosure. Effects of the new embodiment obtained by the combination include effects of the original embodiments.

The present application is based on the Japanese Patent Application No. 2020-27026 filed on Feb. 20, 2020, and the contents thereof are incorporated herein as reference.

INDUSTRIAL APPLICABILITY

The present disclosure has an effect of being capable of shortening time for specifying a newly occurring event, and is useful for an event information recording device, an event information reference system, and the like.

REFERENCE SIGNS LIST

10 Event information recording device
11 First storage unit
12 Second storage unit
13 Control unit
131 Detection unit
132 Storage control unit
133 Information providing unit
20 Reference device
21 Storage unit
22 Communication unit
23 Control unit
231 Determination unit
232 Obtaining unit
233 Storage control unit
2 Various sensors
3 Various units
4 Communication unit
V Vehicle

The invention claimed is:

1. An event information reference system comprising:
an event information recording device configured to record an event related to a vehicle, the event information recording device being mounted on the vehicle; and
a reference device configured to refer to the event,
wherein the event information recording device comprises:
 a recording device-side memory; and
 a recording device-side control device configured to:
  detect an occurrence of the event related to the vehicle;
  store event information in association with a corresponding one of a plurality of event types that indicates a type of the event in the recording device-side memory, the event information being information on the event, and to store index information including an event occurrence count, the event occurrence count being a count of occurrences of the event in association with a corresponding one of the plurality of event types; and
  based on detecting the occurrence of the event, add one to the event occurrence count included in the index information stored in the recording device-side memory in association with the event type, wherein the reference device comprises:
a reference device-side memory; and
a reference device-side control device configured to:
store an event occurrence count in association with a target event in the reference device-side memory, the target event being the event to be referred to by the reference device;
refer to the index information stored in the recording device-side memory and determine whether the event occurrence count of the target event included in the index information is consistent with the event occurrence count of the target event stored in the reference device-side memory; and
based on determining that the event occurrence counts of the target event are inconsistent, obtain the event information in association with the target event from the recording device-side memory.

2. The event information reference system according to claim 1, wherein in the storing, the reference device-side control device is further configured to:
store the obtained event information in the reference device-side memory; and
add one to the event occurrence count of the target event stored in the reference device-side memory.

* * * * *